(12) United States Patent
Guest (10) Patent No.: US 7,032,932 B2
(45) Date of Patent: Apr. 25, 2006

(54) TUBE COUPLINGS

(75) Inventor: John Derek Guest, Maidenhead (GB)

(73) Assignee: John Guest International Limited, West Drayton (GB)

( * ) Notice: Subject to any disclaimer, the term of this patent is extended or adjusted under 35 U.S.C. 154(b) by 7 days.

(21) Appl. No.: 10/660,099

(22) Filed: Sep. 11, 2003

(65) Prior Publication Data

US 2004/0061329 A1     Apr. 1, 2004

(30) Foreign Application Priority Data

Sep. 11, 2002   (GB)   .................................... 0221076

(51) Int. Cl.
*F16L 55/00* (2006.01)
*F16L 21/06* (2006.01)

(52) U.S. Cl. .................... 285/92; 285/322; 285/354

(58) Field of Classification Search ................ 285/92, 285/307, 322, 354
See application file for complete search history.

(56) References Cited

U.S. PATENT DOCUMENTS

| | | |
|---|---|---|
| 2,452,277 A | 10/1948 | Woodling |
| 2,475,741 A | 7/1949 | Goeller |
| 2,640,716 A | 6/1953 | Bigelow |
| 2,728,895 A | 12/1955 | Quackenbush et al. |
| 2,935,299 A * | 5/1960 | Jansen ....................... 254/29 A |
| 2,953,398 A | 9/1960 | Haugen et al. |
| 3,107,108 A | 10/1963 | Greene |
| 3,180,664 A | 4/1965 | Franck |
| 3,233,924 A | 2/1966 | Stanley et al. |
| 3,250,550 A | 5/1966 | Lyon |
| 3,334,661 A | 8/1967 | Milette |
| 3,380,765 A | 4/1968 | Himmel |
| 3,454,290 A | 7/1969 | Tairraz |
| 3,552,781 A | 1/1971 | Helland |
| 3,679,241 A | 7/1972 | Hoffmann |
| 3,747,964 A | 7/1973 | Nilsen, Jr. |
| 3,834,742 A | 9/1974 | McPhillips |
| 3,909,046 A | 9/1975 | Legris |
| 3,989,283 A | 11/1976 | Pepper |
| 4,005,883 A | 2/1977 | Guest |
| 4,025,093 A | 5/1977 | Leczycki |

(Continued)

FOREIGN PATENT DOCUMENTS

EP    0 945 662 A2    9/1999

(Continued)

*Primary Examiner*—James M. Hewitt
(74) *Attorney, Agent, or Firm*—Workman Nydegger (57) ABSTRACT

A tube coupling comprising a coupling body having a throughway open at one end to receive an end portion of the tube and having an internal cam surface tapering towards the open end in which a collet is located for locking the tube in the coupling body by engagement with the tapered cam surface. The coupling body has a main body portion the throughway of which receives the end of the tube and a stop to limit the insertion of the collet and an end cap in screw threaded engagement with the main body having an open end into the throughway and the tapered cam surface. The cap is retained on the main body by an annular diaphragm encircling the body which engages in a wide slot formed in the inner periphery of the cap. The diaphragm snaps into the slot when the cap is screwed onto the main body portion to a first position in which a tube can be inserted through the collet into the coupling body and released. The diaphragm allows the cap to be screwed further onto the coupling body to a position in which the collet is locked to the tube to prevent release of the tube.

18 Claims, 8 Drawing Sheets

U.S. PATENT DOCUMENTS

| | | | |
|---|---|---|---|
| 4,062,572 A | 12/1977 | Davis | |
| 4,136,897 A | 1/1979 | Haluch | |
| 4,188,051 A | 2/1980 | Burge | |
| 4,253,686 A | 3/1981 | Aitken et al. | |
| 4,298,222 A | 11/1981 | Davies | |
| 4,305,606 A | 12/1981 | Legris | |
| 4,309,050 A | 1/1982 | Legris | |
| 4,335,908 A | 6/1982 | Burge | |
| 4,613,158 A | 9/1986 | Ekman | |
| 4,637,636 A | 1/1987 | Guest | |
| 4,655,159 A | 4/1987 | McMills | |
| 4,666,192 A * | 5/1987 | Zamora | 285/322 |
| 4,867,489 A | 9/1989 | Patel | |
| 4,993,755 A | 2/1991 | Johnston | |
| 5,056,829 A | 10/1991 | Kramer | |
| 5,121,949 A | 6/1992 | Reese | |
| 5,150,924 A | 9/1992 | Yokomatsu et al. | |
| 5,181,751 A | 1/1993 | Kitamura | |
| 5,217,261 A | 6/1993 | DeWitt et al. | |
| 5,362,110 A | 11/1994 | Bynum | |
| 5,388,866 A | 2/1995 | Schlosser | |
| 5,466,019 A | 11/1995 | Komolrochanapron | |
| 5,593,186 A | 1/1997 | Harris | |
| 5,607,190 A | 3/1997 | Exandier et al. | |
| 5,746,454 A * | 5/1998 | Webb | 285/92 |
| 5,957,509 A | 9/1999 | Komolrochanapron | |
| 6,017,066 A * | 1/2000 | Giuffre' | 285/38 |
| 6,056,326 A | 5/2000 | Guest | |
| 6,095,572 A | 8/2000 | Ford et al. | |
| 6,193,239 B1 | 2/2001 | Fukano et al. | |
| 6,293,595 B1 | 9/2001 | Marc et al. | |
| 6,478,343 B1 * | 11/2002 | King Lee | 285/322 |
| 2002/0008386 A1 * | 1/2002 | Lee | 285/322 |
| 2002/0109353 A1 | 8/2002 | Guest | |
| 2003/0006610 A1 | 1/2003 | Werth | |
| 2003/0085568 A1 | 5/2003 | Guest | |
| 2004/0056481 A1 * | 3/2004 | Do et al. | 285/92 |

FOREIGN PATENT DOCUMENTS

| | | |
|---|---|---|
| EP | 1 087 168 A1 | 3/2001 |
| EP | 1 233 225 | 8/2002 |
| EP | 1 310 720 A2 | 5/2003 |
| EP | 1 359 362 A1 | 11/2003 |
| EP | 1 359 363 A2 | 11/2003 |
| FR | 2 227 483 | 11/1974 |
| FR | 2 394 736 | 1/1979 |
| FR | 2 689 205 | 10/1993 |
| GB | 1 520 742 | 8/1978 |
| GB | 2 167 147 A | 5/1986 |

* cited by examiner

TUBE COUPLINGS

BACKGROUND OF THE INVENTION

1. Field of the Invention

This invention relates to tube couplings.

2. Background Prior Art

UK-A-1520742 discloses a "Speedfit" connector comprising a coupling body with a throughway open at one end and a tapered cam surface in the open end to receive a collet for locking a tube in the coupling. The collet is compressed against the tube by a slight withdrawal of the tube/collet from the coupling body which locks the tube in the coupling body. The collet can be depressed into the body to release the tube when required.

UK-A-2167147 discloses a "SuperSeal" connector which is a modification of the "Speedfit" connector and has a separate sleeve screwed into the open end of the coupling body in which the tapered cam is formed. By screwing the sleeve into the coupling body the gripping action of the collet on the tube is increased. Also the collet becomes locked up in the coupling body and cannot be depressed to release the tube. The tube is then permanently locked in the coupling body.

EP-A-0945662 discloses a tube coupling having both "Speedfit" and "SuperSeal" modes of operation. More particularly the coupling comprises a coupling body having a throughway open at one end to receive an end portion of a tube and having an internal cam surface tapering towards the open end in which a collet is located for locking the tube in the coupling body by engagement with the tapered cam surface and having stop means to limit entry of the collet into the throughway. The coupling body has a main portion, the throughway of which receives the end of the tube and contains said stop means to limit insertion of the collet and an end cap in screw threaded engagement with the main body. The end cap provides said open end to the throughway and the tapered cam surface. Indexing means are provided between the end cap and the main body to define different positions of rotation of adjustment in the first of which the tube can be inserted in and by depressing the collet into the coupling body, released in the coupling body (i.e. "Speedfit" mode) and in the second of which the collet is engaged with the stop means to prevent the collet being depressed into the coupling body to release the tube (i.e. "SuperSeal" mode).

There is a need to provide an alternative construction to achieve both "Speedfit" and "SuperSeal" functions whilst simplifying manufacture and assembly.

SUMMARY OF THE INVENTION

This invention provides a tube coupling comprising a coupling body having a throughway open at one end to receive an end portion of the tube and having an internal cam surface tapering towards the open end in which a collet is located for locking a tube in the coupling body by engagement with the tapered cam surface, and having stop means limit entry of the collet into the throughway, the coupling body having a main body portion the throughway of which receives the end of the tube and contains the stop means to limit the insertion of the collet and an end cap in screw threaded engagement with the main body portion having an open end into the throughway and the tapered cam surface, wherein detent means are provided acting between the end cap and the main body portion which are engaged by screwing the cap onto the body past a first position in which a tube can be inserted through the collet into the coupling body and released from the coupling body by depressing the collet into the body, the detent means permitting the cap to be screwed further onto the body to a second position in which the collet is held by the cap in engagement with the stop to prevent the collet means pressed to release the tube engaged in the collet.

The arrangement removes the cams from both the cap and body. Instead, in a preferred embodiment the body has a thin, flexible, flange or "diaphragm" protruding radially from the body's outside diameter. The cap has an internal slot, similar to a circlip groove. As the cap is assembled onto the body the cap butts against the diaphragm and bends away as the cap passes beyond. Thereafter, the diaphragm snaps into the groove but due to the groove's major diameter cannot flex back to its original position — it is always bent in the direction opposing any removal of the cap from the body.

With this arrangement the diaphragm is snap engaged in the slot with longitudinal movement of the cap along the body. The cap's position is constrained lengthwise by the end of the cap butting against the large inflexible flange on the body or by the flexible diaphragm opposing and butting against the end of the groove in the cap.

The design as shown in the attached drawings also has a tapered major groove diameter in the cap. This taper allows the diaphragm to expand as the cap is screwed further onto the body thereby reducing friction between the two and providing the user with better tactile feed back. This encourages the user to maintain the two preferred positions for the cap in use: either extreme for "Speedfit" or "SuperSeal" are not somewhere in between.

Preferably, stop means are provided for acting between the cap and main body portion limiting the extent to which the cap can be screwed onto the body portion to define the second position of the cap on the body portion.

More specifically, the stop means comprise a raised abutment on the main body portion located in the path of the cap as it is screwed onto the body portion to be engaged by the cap when the cap reaches its second position on the body portion.

In the latter arrangement, the raised abutment on the coupling body portion may be an annular abutment which is engageable with the leading end of the cap as the cap is screwed onto the coupling body.

In any of the above arrangements, the detent means acting between the cap and coupling body may comprise a radially outwardly projecting detent formed on the coupling body engageable with a slot formed in a cap.

More specifically, the detent may comprise an annular resilient flange or diaphragm projecting radially outwardly of the coupling body and the cap may have an annular slot encircling an inner side of the cap in which the annular flange is engageable, the slot having a width sufficient to allow the cap to move between said first position in which the flange is located at one end of the slot and prevents the cap from withdrawal from the coupling body and said second position in which the flange is located towards the other end of the slot.

By way of example the annular slot may be spaced away from the leading end of the cap in the direction in which the cap is located on the coupling body and a portion of the cap between the slot and under the cap may be adapted to deflect the flange as the cap is screwed onto the coupling body until the flange reaches and snaps into the slot.

In the latter case the slot and the flange may be dimensioned so that the flange is held in the slot bent over towards the leading end of the cap so that when the cap is unscrewed from the second position to the first position, the flange will engage the end of the slot in the first position and resists further withdrawal of the cap from the coupling body.

Furthermore, the bottom of the slot may converge with the coupling body towards the leading end of the cap so that as the cap is screwed onto the coupling body to the first and second positions, so that the extent to which the flange is deflected by engagement with the bottom of the slot reduces.

BRIEF DESCRIPTION OF THE DRAWINGS

The following is a description of some specific embodiments of the invention, reference being made to the accompanying drawings in which.

DESCRIPTION OF THE PREFERRED EMBODIMENTS

Figure 1:
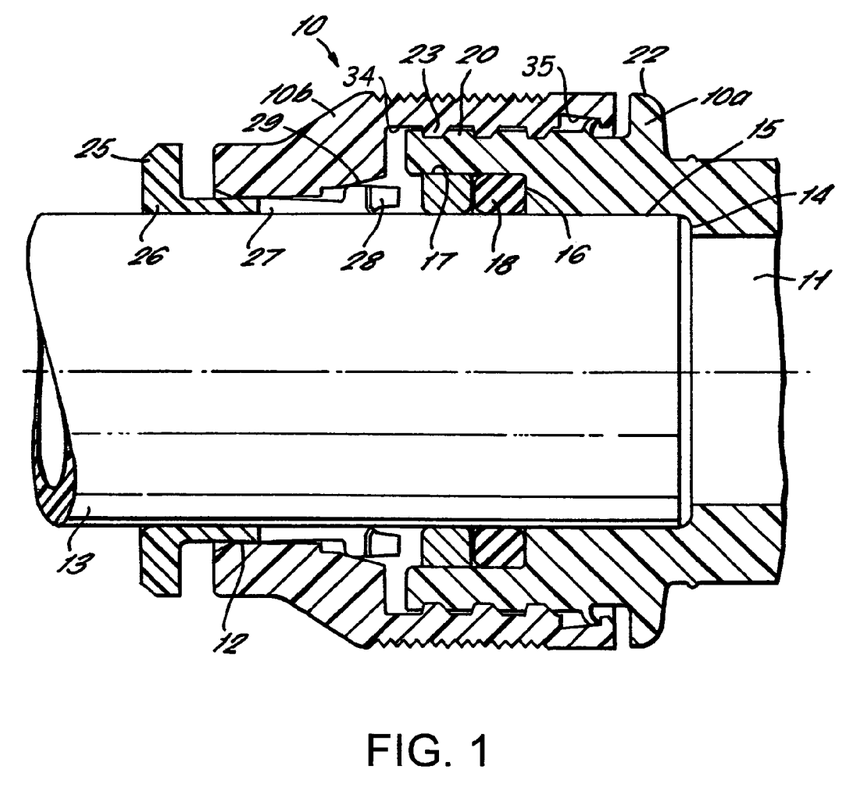
FIG. 1 is a cross-sectional view of a tube coupling in accordance with the invention including a tube inserted in the coupling.

Referring firstly to FIG. 1 of the drawings, there is shown a moulded plastics tube coupling body indicated generally by reference numeral 10 having a throughway 11 open at one end 12 to receive an end portion of a tube 13. The coupling body comprises a main body portion 10a and an end cap 10b screwed onto the main body as described below.

At a location spaced from the open end, the throughway in the main body has a first increase in diameter at a step 14 to provide an enlarged bore 15 in which the end of the tube 13 is a close sliding fit with the end of the tubing engaging the step 14. The throughway has a further increase in diameter at a step 16 to form an enlarged bore 17 in which an 'O' ring seal 18 is located against the step followed by a spacer washer or compression ring 19.

The main body portion 10a of the coupling has an external screw-threaded section 20 extending from the end of the body part followed by a plain section in which a detent is formed as described later and followed in turn by an encircling radial flange 22. The end cap 10b of the coupling body encircles the main body and has an internal feature for engaging with the detent on the main body portion again as described later.

A collet indicated at 25 is mounted in the open end of the coupling body comprising an annular member 26 and resilient arms 27 projecting from the annular member into the throughway of the coupling body and terminating in heads 28. The heads of the collet engage in a tapered cam surface 29 converging towards the end of the coupling body to be compressed against the tube 13 by engagement of the heads with the cam surface to lock the tube in the coupling body.

Figure 2:
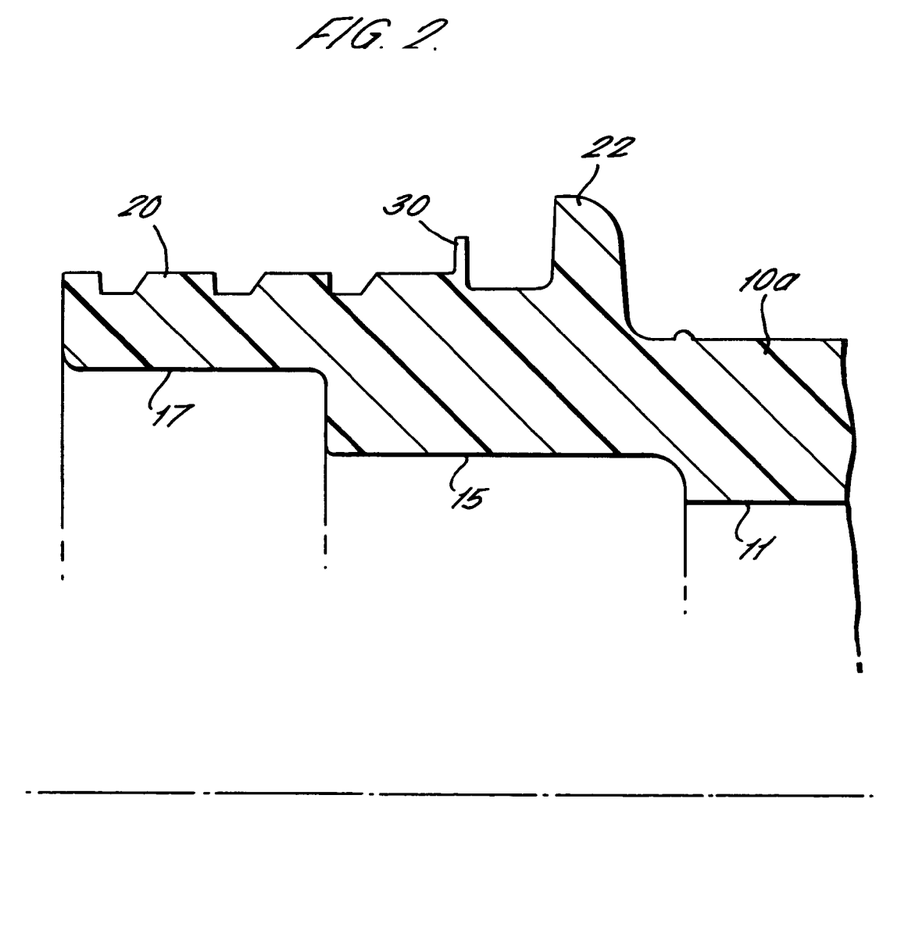
FIG. 2 is a detailed view of part of a coupling body of the tube coupling.

Reference is now made to FIG. 2 of the drawings which is a cross-sectional view through part of the main body portion 10a. Between the end of the screw threaded section 20 on the main body and the flange 22 there is an upstanding annular flexible diaphragm 30 formed integrally with the body. The diaphragm forms part of the detent arrangement referred to above for engaging with and locking the cap on the body as described below.

The end flange 22 has an abutment face 32 to provide an end stop for the cap when the latter is fully screwed onto the coupling body as described below.

Figure 3:
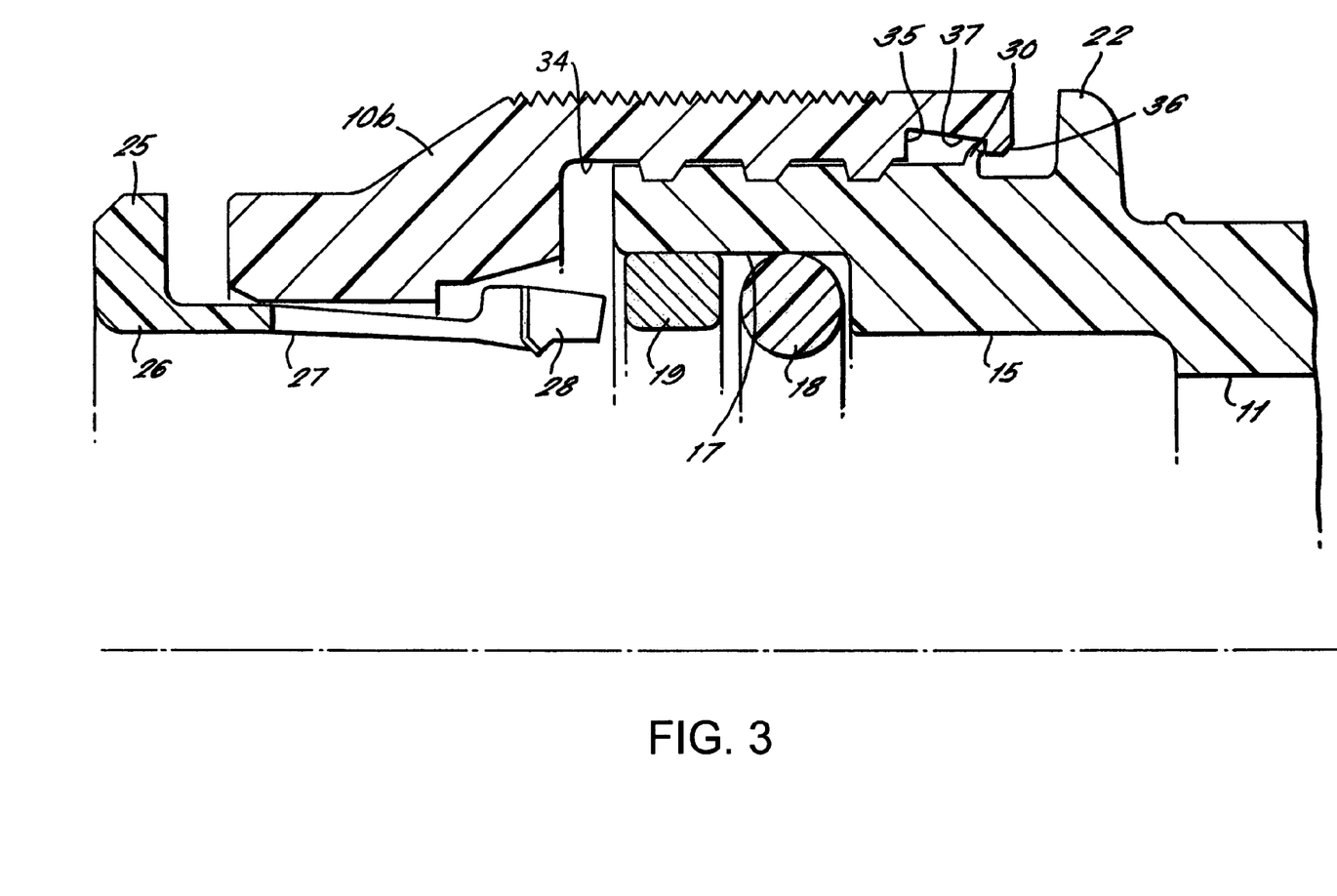
FIG. 3 is a cross-sectional view through part of the tube coupling showing a cap on the coupling body in the first "Speedfit" position.

Turning now to FIG. 3 of the drawings, the end cap 10a is shown partially screwed onto the body to a first position in which the collet in the cap receives and holds a tube in the coupling body in the "Speedfit" manner. That is to say, the tube is locked in the coupling body but can be released by depressing the collet into the coupling body to release the gripping engagement of the collet with the tube and allow the tube to be withdrawn.

The inner side 34 of the end of the cap is formed on with an encircling slot 35, in which the annular diaphragm 30 is engageable. The mouth of the cap has a bevelled entry indicated at 36 to assist in deflecting the diaphragm as the cap is screwed onto the body and the diameter of the mouth of the cap leading is slightly greater than the rest of the inner diameter of the cap to facilitate entry of the diaphragm into the slot. Screwing the cap onto the body sufficiently to engage the diaphragm to engage the end of the slot nearest the mouth of the cap locates the cap in the first "Speedfit" position referred to above. The bottom wall 37 of the slot is tapered to reduce in diameter towards the open end of the cap so that the diaphragm is held bent over towards the side of the slot adjacent the mouth of the slot. Thus, the diaphragm is held in engagement in the corner formed between the bottom wall of the slot and the side wall of the slot when the cap is rotated in the direction to withdraw from the main body to prevent withdrawal of the cap from the main body portion beyond the first position.

Figure 4:
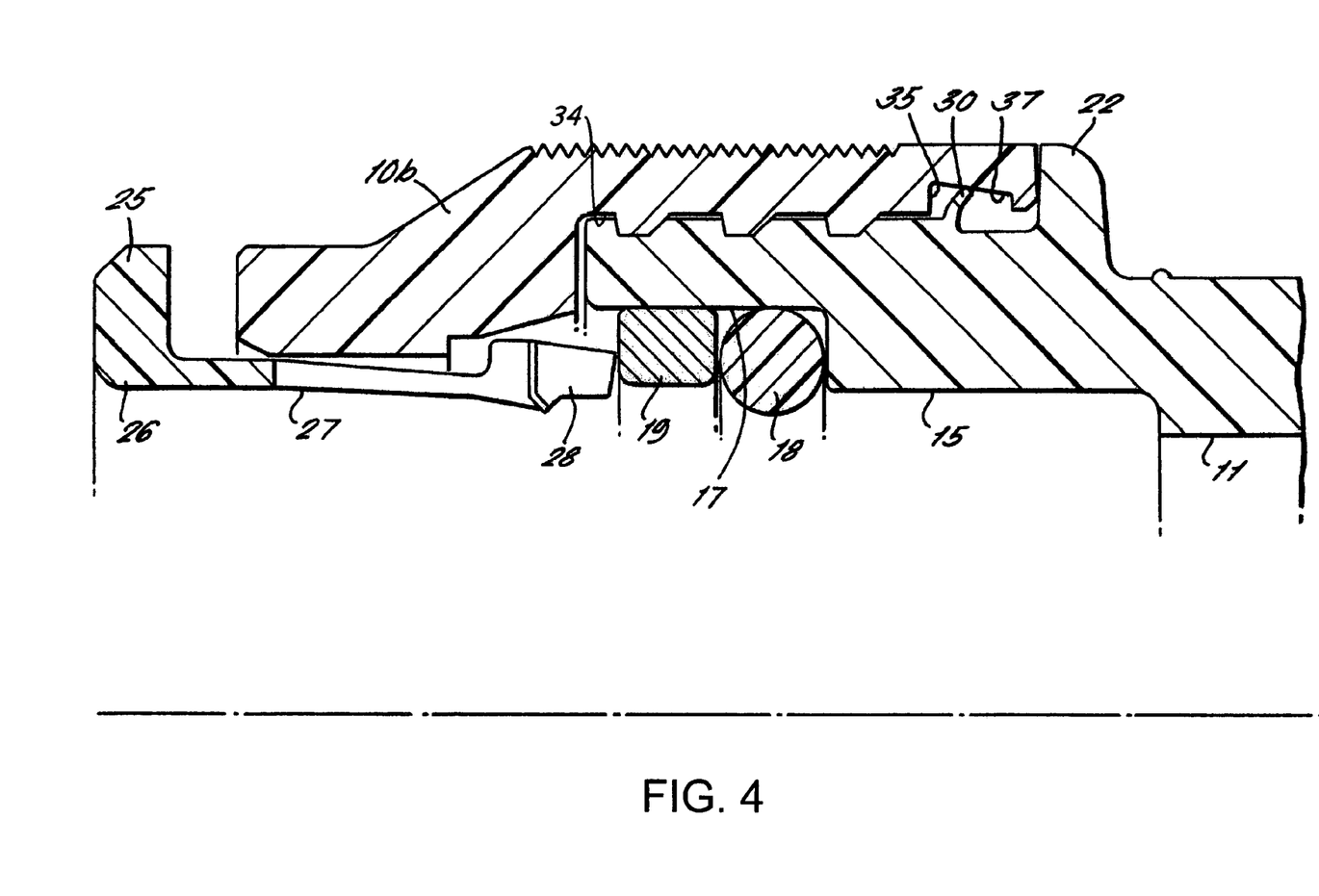
FIG. 4 is a cross-sectional view through part of the coupling body showing the cap in the second "SuperSeal" position.

As the cap is screwed further onto the body, the diaphragm rides up the tapering undercut of the bottom wall of the slot in the cap relaxing the diaphragm slightly, and therefore reducing the resistance to rotation of the cap. The cap can then be screwed onto the body until it engages the upstanding end flange 22 of the coupling body as indicated in FIG. 4 in which the cap is in the second or "SuperSeal" position. The collet is then held in engagement with the end stop in the coupling body and cannot be depressed to allow a tube to be released from the coupling body.

The arrangement thus provides a tube coupling body which is readily assembled and which provides both "Speedfit" and "SuperSeal" functions without unduly stressing the components of the body.

Figure 7:
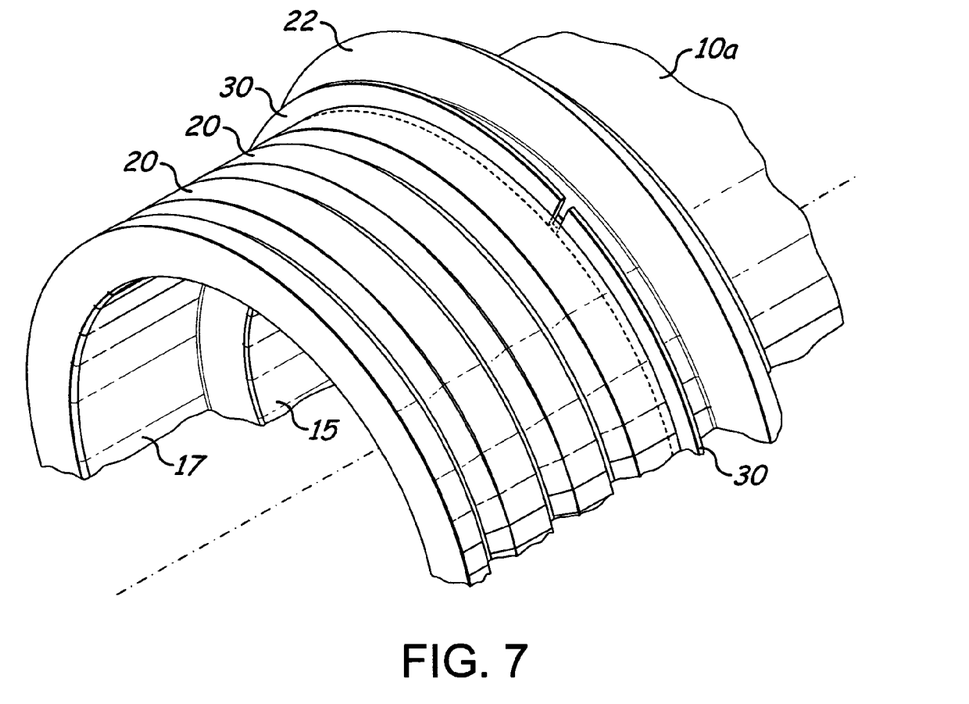
FIG. 7 is a partial perspective view of the coupling body showing a diaphragm formed on an insert ring according to another alternative embodiment of the present invention.
Figure 8:
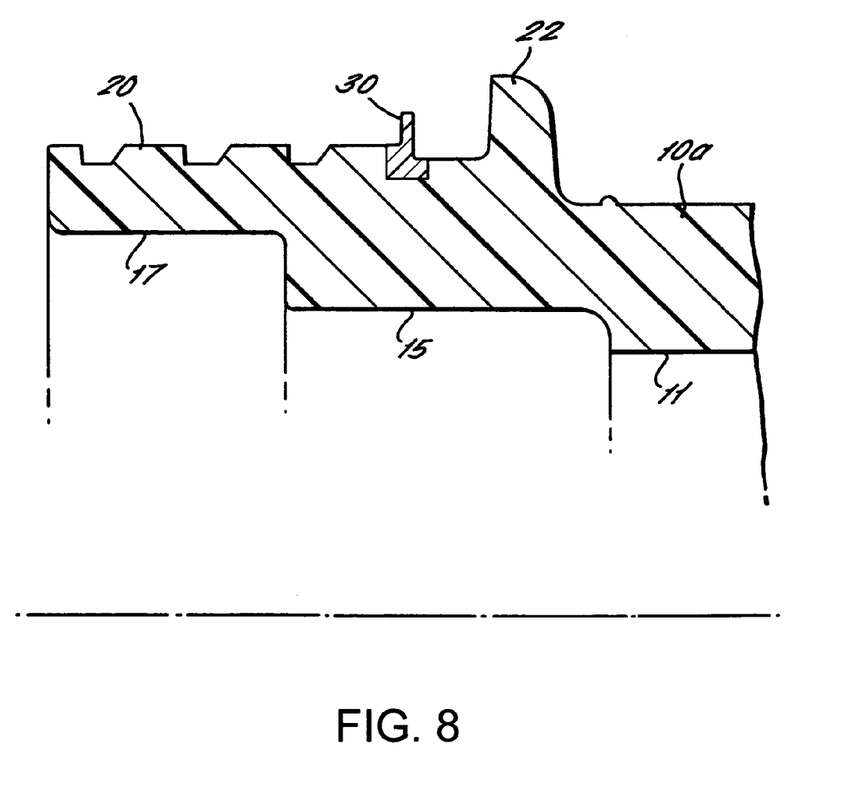
FIG. 8 is a detailed view of part of a coupling body of the tube coupling of FIG. 7 showing the insert ring mounted in a groove on the coupling body.

A number of further embodiments in the invention are also envisaged as follows:

This design can also be used on metal coupling bodies or rigid plastic coupling bodies in which case the flexible diaphragm could be moulded on a separate split ring which is assembled into a groove or recess on the body between the thread and the large flange as illustrated in FIGS. 7 and 8 so that the detent engages in the slot on the cap.

Equally the separate split ring could be mounted in the cap with the diaphragm with the flexible diaphragm projecting radially inwardly to engage in a slot in the main body portion.

The slot or groove in the body portion would be located between the thread and the large flange. Again, the slot or groove in the body could have a tapered major diameter.

Figure 6:
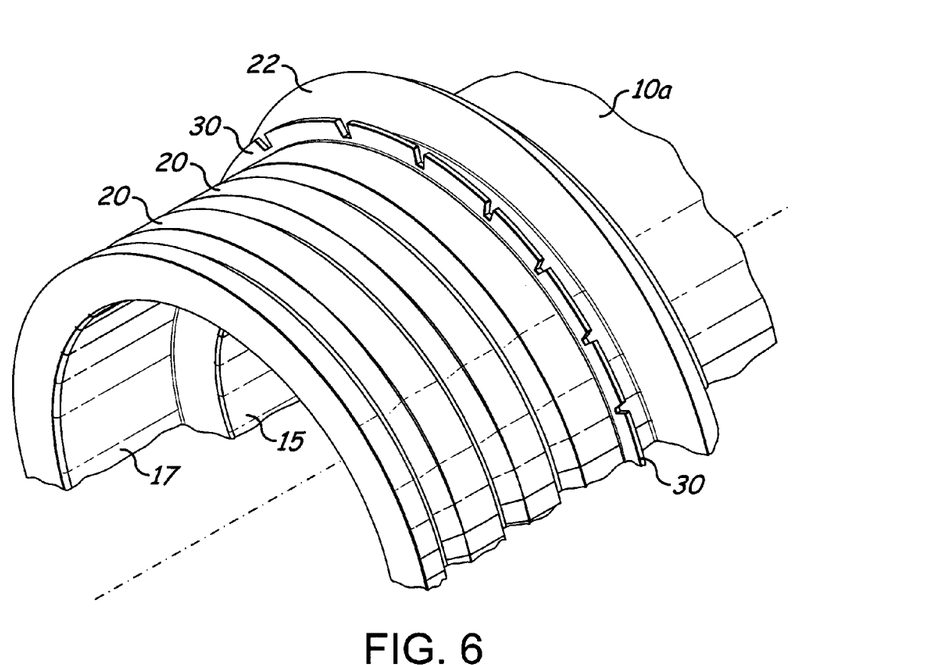
FIG. 6 is a partial perspective view of the coupling body showing a diaphragm comprised of a series of segments according to an alternative embodiment of the present invention.

In all of the designs above the diaphragm could be interrupted once or several times as illustrated in FIG. 6 to allow for tooling or to allow the diaphragm's resilient/flexible characteristics to be optimised.

Figure 5:
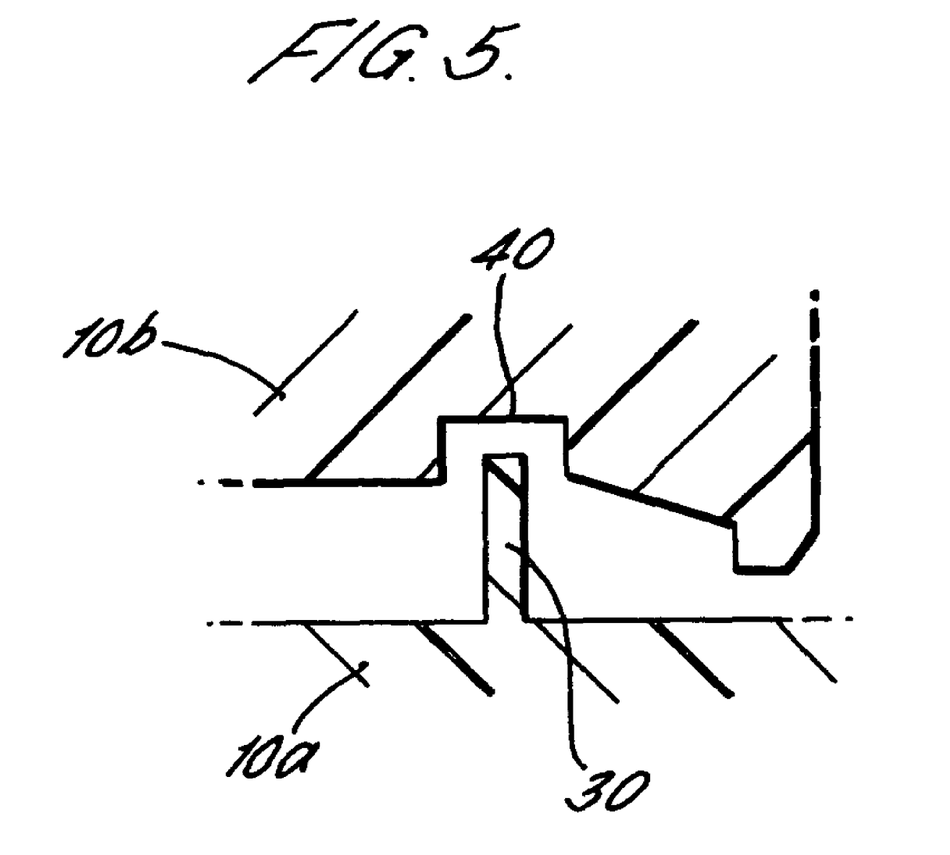
FIG. 5 shows a modified form of the end cap of the coupling body.

In accordance with the further modification, an enlarged groove 40 is formed at the end of the slot remote from the open end of the cap as illustrated in FIG. 5. When the cap is rotated provisionally to move the diaphragm into this position, the cap is in a non-load imposing position and thereby allowing easy threading.

The invention claimed is:

1. A tube coupling comprising:
a coupling body having a throughway open at one end, at least a portion of the throughway being adapted to receive a tube;
an end cap in screw-threaded engagement with the coupling body to move between initial and advanced positions along the coupling body and having an opening for the tube and an internal tapering cam surface;
a collet at least partially disposed in the end cap engaging the cam surface to lock the tube in the cap with movement of the collet outwardly of the cap and to release the tube when depressed inwardly of the cap;
stop means in the coupling body for limiting movement of the collet inwardly of the end cap, the initial position of the end cap on the coupling body allowing the tube to be inserted and locked in the end cap by the collet and to be released by depressing the collet inwardly of the end cap and the advanced position of the end cap holding the collet adjacent the stop means in the coupling body to prevent release of the tube; and
detent means acting between the end cap and coupling body for providing resistance to movement of the end cap along the coupling body until the end cap reaches said initial position on the coupling body and to allow said further movement of the end cap to the advanced position, the detent means comprising a flexible diaphragm encircling one of the coupling body and the end cap and an annular slot in the other of the end cap and coupling body in which the diaphragm is snap engaged in said initial position of the end cap on the coupling body, the slot having a width which accommodates the travel of the diaphragm.

2. A tube coupling as claimed in claim 1, wherein the coupling body has an external screw-threaded portion extending along the coupling body from said one end and the end cap has an open mouth to encircle the coupling body and a screw-threaded portion extending from a location adjacent the open mouth internally along the end cap to engage with the screw-threaded portion on the coupling body.

3. A tube coupling as claimed in claim 2, wherein the detent means are provided on the coupling body adjacent the end of the screw-thread remote from said open end of the coupling body and within the end cap between the screw-thread and mouth of the end cap.

4. A tube coupling as claimed in claim 2, wherein the diaphragm is formed on the coupling body and the mouth of the end cap is formed with an inturned lip providing a restricted opening of smaller diameter than the outer diameter of the diaphragm and with the annular slot encircling the inner side of the end cap inwardly of the lip into which the annular diaphragm can snap after being deformed as it passes through the annular lip in the mouth of the end cap to define said initial position of the end cap on the coupling body and to hold the diaphragm in a deformed state in engagement with the bottom of the slot to resist withdrawal of the end cap from the coupling body.

5. A tube coupling as claimed in claim 4, wherein the annular slot tapers outwardly away from the lip into the end cap so that as the end cap is advanced along the coupling body past the diaphragm, the diaphragm can slide along and expand into the deepening part of the slot to reduce the deformity imposed on the diaphragm.

6. A tube coupling as claimed in claim 5, wherein the slot in the end cap at its deeper end has an extended deeper slot into which the diaphragm can extend in the advanced position of the end cap on the coupling body, the deeper slot being sufficiently deep to accommodate the diaphragm without deformation.

7. A tube coupling as claimed in claim 1, wherein the diaphragm is a single continuous diaphragm encircling the coupling body.

8. A tube coupling as claimed in claim 1, wherein the diaphragm comprises a series of segments extending around the coupling body.

9. A tube coupling as claimed in claim 1, wherein the annular diaphragm is formed on a separate insert ring mounted on the coupling body.

10. A tube coupling as claimed in claim 9, wherein the insert ring is a split ring mounted in a groove in the coupling body.

11. A tube coupling as claimed in claim 2, wherein the coupling body is formed with an external upstanding annular abutment located beyond the diaphragm from the screw-thread on the coupling body to provide an end stop for restricting the extent to which the end cap can be screwed onto the coupling body to define said advanced position in which the end cap can be screwed to lock the tube in the collet.

12. A tube coupling as claimed in claim 1, wherein the stop means in the coupling body to restrict movement of the collet when depressed into the coupling body comprise a sealing arrangement located in the coupling body for the tube.

13. A tube coupling as claimed in claim 12, wherein the sealing arrangement comprises a spacer ring encircling the throughway in the coupling body and an O-ring seal located between the spacer ring and a shoulder formed in the throughway, the inner end of the collet being engageable with the spacer ring to restrict entry of the collet into the coupling body.

14. A tube coupling comprising:
a coupling body having a throughway open at a first end;
a tubular end cap in screw-threaded engagement with the first end of the coupling body, the end cap being selectively movable between an initial position and an advanced position along the coupling body, the end cap having an interior surface comprising a tapering cam surface;
a collet at least partially disposed in the end cap so as to selectively bias against the tapering cam surface of the end cap;
a stop disposed in the coupling body, the stop restricting advancement of the collet into the end cap when the end cap is in the advanced position;

a flexible diaphragm extending between the coupling body and the end cap, the flexible diaphragm encircling one of the coupling body and the end cap; and an annular slot in the other of the end cap and coupling body in which the diaphragm is disposed when the end cap is in the initial position, the slot having a width which accommodates the travel of the diaphragm.

15. A tube coupling as claimed in claim 14, further comprising:

the diaphragm being formed on the coupling body; and a lip radially inwardly projecting from the interior surface of the end cap, the lip providing a restricted opening of smaller diameter than an outer diameter of the diaphragm, the annular slot being disposed on the interior surface of the end cap inward of the lip.

16. A tube coupling as claimed in claim 15, wherein the annular slot tapers outwardly away from the lip so that as the end cap is advanced along the coupling body over the diaphragm, the diaphragm can slide along and expand into the slot to reduce the deformity imposed on the diaphragm.

17. A tube coupling as claimed in claim 14, wherein the diaphragm is a single continuous diaphragm encircling the coupling body.

18. A tube coupling as claimed in claim 14, wherein the diaphragm comprises a series of segments extending around the coupling body.

\* \* \* \* \*

UNITED STATES PATENT AND TRADEMARK OFFICE
CERTIFICATE OF CORRECTION

| | | |
|---|---|---|
| PATENT NO. | : 7,032,932 B2 | Page 1 of 1 |
| APPLICATION NO. | : 10/660099 | |
| DATED | : April 25, 2006 | |
| INVENTOR(S) | : John Derek Guest | |

It is certified that error appears in the above-identified patent and that said Letters Patent is hereby corrected as shown below:

Column 2
Line 30, change "are" to --and--

Column 5
Line 2, delete "with the diaphragm"

Column 6
Line 43, change "comprise" to --comprises--

Signed and Sealed this

Twentieth Day of February, 2007

JON W. DUDAS
*Director of the United States Patent and Trademark Office*